Figure 1:
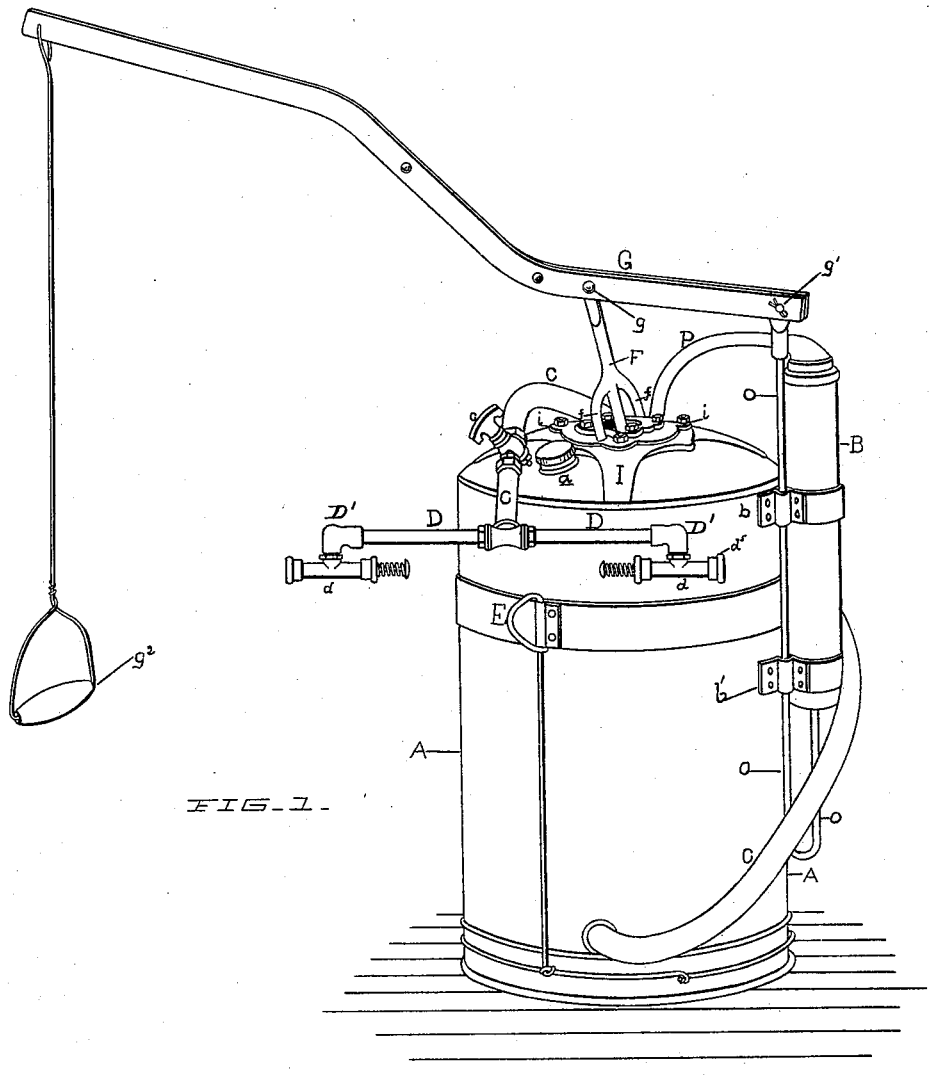

(No Model.) 4 Sheets—Sheet 1.

J. H. BURCK.
SPRAYING APPARATUS.

No. 593,732. Patented Nov. 16, 1897.

WITNESSES:

INVENTOR.
John H. Burck
BY J. Russell Parsons
ATTORNEY.

(No Model.)  4 Sheets—Sheet 2.
J. H. BURCK.
SPRAYING APPARATUS.
No. 593,732. Patented Nov. 16, 1897.
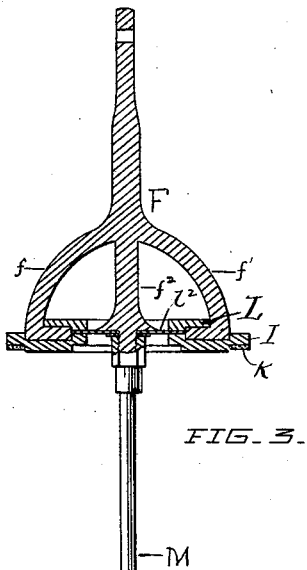
FIG. 3.
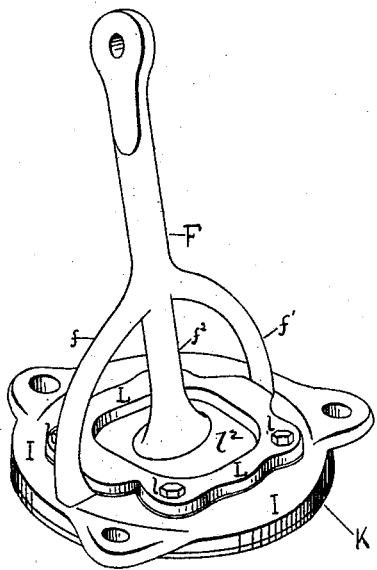
FIG. 2.
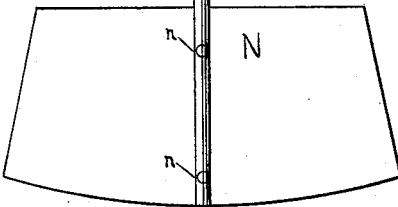
WITNESSES:
INVENTOR,
John H. Burck
BY J. Russell Parsons
ATTORNEY.

(No Model.) 4 Sheets—Sheet 3.

J. H. BURCK.
SPRAYING APPARATUS.

No. 593,732. Patented Nov. 16, 1897.

WITNESSES:
Chas. H. Stallo
Walter Wood Parsons

INVENTOR.
John H. Burck
BY J. Russell Parsons
ATTORNEY.

(No Model.) 4 Sheets—Sheet 4.

J. H. BURCK.
SPRAYING APPARATUS.

No. 593,732. Patented Nov. 16, 1897.

WITNESSES.
G. Walter Willis.
Walter Wood Parsons.

INVENTOR.
John H. Burck
BY J. Russell Parsons
ATTORNEY.

UNITED STATES PATENT OFFICE.

JOHN H. BURCK, OF NORTH HOOSICK, NEW YORK.

SPRAYING APPARATUS.

SPECIFICATION forming part of Letters Patent No. 593,732, dated November 16, 1897.

Application filed September 19, 1896. Serial No. 606,383. (No model.)

*To all whom it may concern:*

Be it known that I, JOHN H. BURCK, a citizen of the United States of America, residing at North Hoosick, in the county of Rensselaer and State of New York, have invented certain new and useful Improvements in Spraying Apparatus, of which the following is a specification.

My invention relates to that class of apparatus which may be used for spraying plants and growing crops, either with or without chemical compounds, for the destruction of insects, for sprinkling, or for other purposes, as whitewashing, &c.

In the accompanying drawings I have shown the invention as adapted to be carried on a man's back. The same may be used in a stationary position. The same invention may be used upon a cart to be drawn over the ground. The adaptation of the machine to a cart or other conveyance and the connection for operating the pump by the rotation of the wheel or wheels of the cart will readily occur to any mechanic. For that reason I do not deem it necessary to show such adaptation in the drawings or describe the same.

I have shown the apparatus fitted for spraying plants with liquid impregnated with insect poison—for instance, paris-green—to destroy potato-bugs, and it consists of a tank to contain the liquid, in which is a stirrer or paddle to mix the poison thoroughly with the water, and of an air-pump and distributing-pipe with nozzle, the pressure of the air pumped into the tank from the pump causing the liquid to flow out in a stream, in a spray, or in a fine mist, graduated in form or quantity to suit the will of the operator.

To enable others skilled in the art to make and use my invention, I will proceed to describe the same, reference being had to the accompanying drawings, making a part of this specification, in which—

Figure 4:
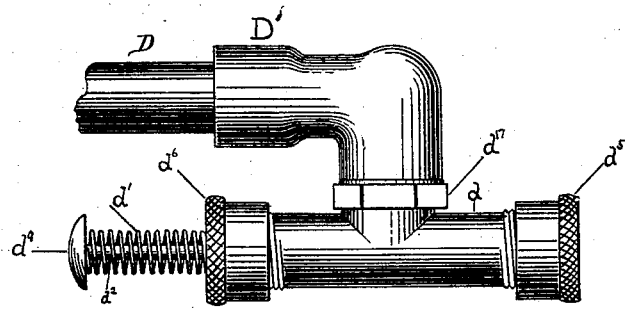
Figure 5:
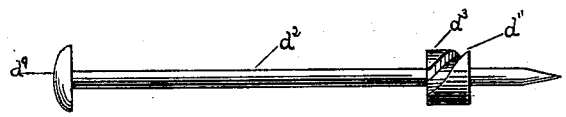
Figure 6:
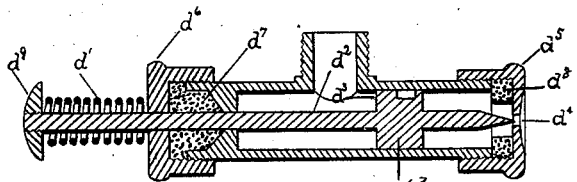
Figure 13:
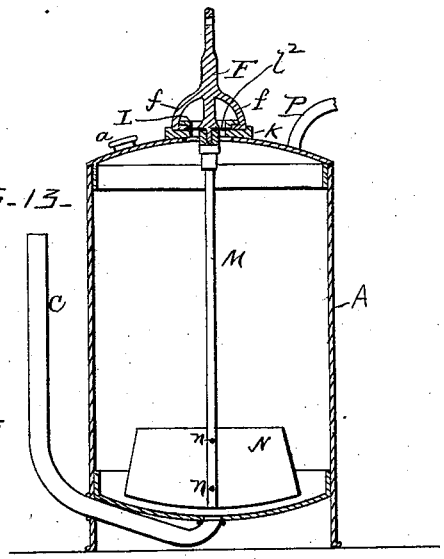
Figure 8:
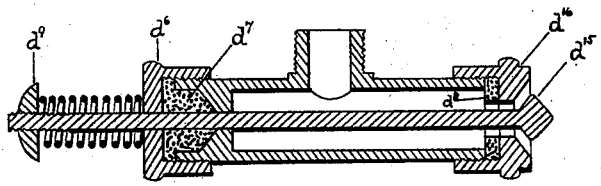
Figure 7:
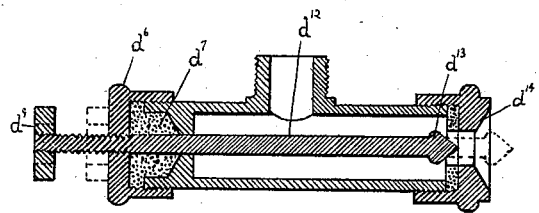
Figure 9:
Figure 11:
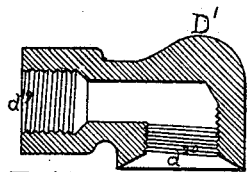
Figure 12:
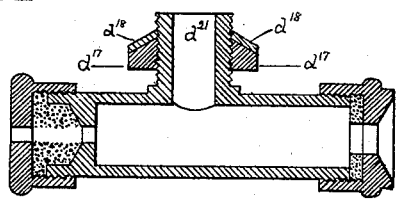
Figure 10:
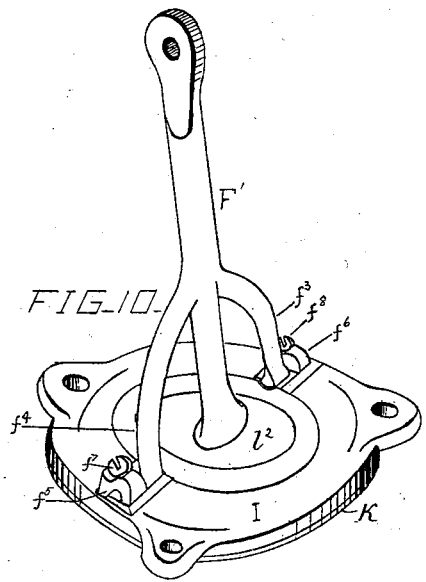

Figure 1 is a view in perspective of the complete machine. Fig. 2 is a view in perspective of the connection of the paddle-support with the top of the tank, also the support or fulcrum in which the arm of the pump-lever works. Fig. 3 is a view in vertical section of Fig. 2 with the stem of the paddle and the paddle attached shown in elevation. Fig. 4 is a side view of a portion of the discharge-pipe with a nozzle attached. Fig. 5 is a side view of the rod or spindle which works within the nozzle. Fig. 6 is a view in longitudinal section of the nozzle, showing the rod in place. Fig. 7 is a view in longitudinal section of another form of nozzle. Fig. 8 is a view in longitudinal section of still another or third form of nozzle. Fig. 9 is a side view showing the rod or spindle adapted to be used instead of the spindle in Fig. 8. Fig. 10 is a view in perspective showing a modification of the connection of the paddle-support with the top of the tank, also the support or fulcrum on which the arm of the pump-lever works. Fig. 11 is a view in longitudinal section, showing the connecting-piece between the nozzle and the discharge-pipe. Fig. 12 is a view in longitudinal section, showing the nozzle and its connection with the connecting-piece shown in Fig. 12 with the spindle removed. Fig. 13 is a transverse vertical section of the apparatus.

The several letters of reference designate the same parts in the several figures.

A is the tank which contains the fluid, made, preferably, of copper in order to repel the action of the chemicals to be used, preferably cylindrical in form, but its shape may be varied to suited circumstances. The bottom of the tank is made concave in form on its upper surface in order that the discharge-pipe may remove the entire contents.

B is an air-pump fastened to the outside of the tank in any well-known way.

*a* is the aperture through which the tank is filled, which is closed with a screw-cap which fits air-tight.

C is the discharge-pipe, made of rubber or other flexible material, which by means of proper connections enters the tank near its bottom and extends to the lowest point of the concave bottom. On the upper end of the discharge-pipe is fastened a branch pipe D, with a nozzle *d* attached at each end.

E is a loop attached to a band on the tank. (See Fig. 1.) A corresponding loop is attached on the opposite side. (Not shown.) To these loops are to be attached straps to enable the operator to sling the can over his shoulder in any well-known way. When the can is so mounted on the back of the operator, the discharge-pipe will be in a convenient position to be held by the operator in the desired position to spray the plant, and in case it is required he can spray with both nozzles while walking between the rows of potatoes— for instance, either one row on both sides or one side of two rows, as he sees fit. A stopcock $c$ is provided by which the liquid can be shut off from the nozzles by the operator at will. The top of the can has a large hole in its center, (see Figs. 1, 2, and 3,) through which passes the standard F. This standard F is pivoted to the lever G at $g$. On the top of the can is bolted a plate I by means of bolts $i$. This plate I has a hole to correspond with the hole in the top of the can. Between this plate I and the top of the can is interposed a rubber or leather disk or gasket K, so that when the plate I is firmly bolted to the top of the can it makes the can air-tight. On top of this plate I is bolted another plate L by bolts $l$. This plate has an opening corresponding in size and shape, or nearly so, with the hole in plate I. The standard F is formed with two arms or branches $f f'$, curving from the main stem downwardly. These branches are provided at their lower ends with round projections extending inwardly and take into recesses in the plate L, which forms a hinge for the standard. The middle portion $f^2$ of the standard F is enlarged to present a flat surface or shoulder to the gasket $l^2$ and fits close upon it. The standard is continued from this shoulder in a round form and is provided with a screw-thread, on which is a nut screwed tight against the gasket. The pliability of the rubber gasket $l^2$ will allow the standard F to turn in the hinges at the lower ends of the arms $f f'$. This middle portion of the standard is extended downwardly, and to it is attached the spindle M, which extends downwardly to near the bottom of the can, where it is provided with a paddle N, made of thin metal, fastened to it with rivets $n n$. This paddle is of curved form on the bottom to conform to the concave surface of the bottom at its center and directly over the opening of the outlet-pipe.

In Fig. 10 I have shown the standard F of Figs. 1 and 2 modified in construction, which is simpler and cheaper. In this construction I dispense with the plate L and its bolts and employ at the bottom of the arms $f^3$ and $f^4$ the caps $f^5$ and $f^6$, fastened directly to the plate I by the screws $f^7$ and $f^8$ and which take over projections extending outwardly from the lower ends of arms $f^3$ and $f^4$.

To the short end of the lever G is pivoted the piston-rod O of the air-pump by means of the pin $g'$. This piston-rod passes through supports $b$ and $b'$, fastened to the exterior of the cylinder of the pump B and of the can and can slide up and down in its support $s$. Said rod extends downwardly a proper distance, where it is bent upwardly and is attached to the piston working snugly in the pump-cylinder, and when operated forces air into the tank through the pipe P, the proper well-known valves being provided for the air-pump. To the long end of the lever G and convenient to the operator is hung the handle $g^2$.

In the drawings I have shown two nozzles connected to the discharge-pipe. Of course the construction can be varied to have only one or more than two. It will be sufficient to describe the construction of one.

The nozzle $d$ is attached by an elbow-coupling to the branch pipe D, which is coupled to the discharge-pipe. In the drawings (see Fig. 1) the branch pipe D is continued so as to take the second nozzle. In Figs. 4, 5, and 6 is shown one form of nozzle, which consists of a hollow cylinder with an opening or branch about midway of its length, connecting with the branch pipe D. Over the discharge end of the cylinder is screwed a cap $d^5$, which is pierced with a small hole, through which the liquid passes. This cap is made tight where it comes in contact with the end of the cylinder by a suitable packing $d^8$. The other end of the cylinder is formed of cup shape and solid, with the exception of the cup and a hole bored in it of suitable size to receive the spindle $d^2$. The cup is for the purpose of receiving the packing $d^7$. A cap $d^6$ is screwed onto the end of the cylinder, which is also perforated to receive the spindle $d^2$. Rigidly attached to the spindle at the proper place is the collar $d^3$, which has a sliding fit in the interior surface of the cylinder and is provided with a spiral groove cut in its periphery. The spindle $d^2$ is made pointed at the discharge end, so as to enter the small opening in the end cap whenever it is required to be done in order to free the opening from any material that may have clogged it. This is done by the operator by pressing upon the other end of the spindle. The other end of the spindle is threaded to receive a nut $d^9$. Between the cap $d^6$ and the nut $d^9$ a spiral spring is interposed to withdraw the point of the spindle whenever it is pushed forward to clear or to close the aperture. The tendency of the moving fluid as it is forced into the cylinder is to move the spindle toward the discharge end and to close the small exit-hole in cap $d^5$. The spring will prevent this and retain the spindle in proper position. If the collar $d^3$ is in advance of the opening, as shown in Fig. 6, the fluid will pass through the spiral groove $d^{11}$ and will assume a swirling motion, and as it passes out of the small opening $d^4$ it will assume the spray form and be distributed evenly over the plants or any other surface upon which it is thrown. If the spindle is withdrawn until the collar $d^3$ is back of the opening which admits the fluid into the cylinder, the fluid will be thrown out in a round stream.

In Fig. 7 I show a different construction. The cylinder is the same as in Fig. 6. I dispense with the spiral spring, but use a screw-thread and nut to hold the spindle in the desired position. I make the spindle straight, except it terminates in a conical spur-shaped head at the delivery end and of somewhat greater diameter than the main body of the spindle. The cap $d^{14}$ at the delivery end I make with a different-formed opening from the one shown in Fig. 6. This opening is straight a portion of the distance through the cap and is then countersunk on the outer end—i. e., made in the shape of a frustated cone, the larger base being outward. If the spindle is set so that its end is entirely within the cylinder, the stream will be a solid one. If the spindle is set so that the conical head is outside the cylinder and opposite the flaring face of the outlet, as shown in dotted lines, a spray will be thrown coarse or fine, according to the relative position of the spindle and outlet. The thread upon the spindle should extend some distance in order that the adjustment may have sufficient scope, as when the adjustment is made the nut abuts against the end of the cap and holds the spindle against the force of the liquid from being carried too far.

In Fig. 8 I show another device. In this the cylinder, spiral spring, nut for adjustment, and packings are the same as in Fig. 6. The spindle is different in that its delivery end is always entirely outside the cylinder and is formed with a double conical end— that is, formed like two cones whose bases abut each other. The pointed end of the spindle may be of any other form, as the interior conical form, in combination with the reverse conical form of the opening in the cap, alone causes the stream to assume a spray instead of a solid stream. The exit end in the cap is made the same as in Fig. 7. This construction may be adjusted through the nut-and-spring adjustment to throw a very coarse or a very fine spray, dependent upon the amount of space between the head on the spindle and the flaring opening in the cap. If the nozzle is so adjusted that the surfaces come together, the orifice will be entirely closed. This last construction I have found in practice to require more careful workmanship. As the bearing is all near one end of the cylinder and the spindle projects some distance without support, it is liable to cant to one side, which will make an opening larger on one side than on the other. Again, sediment or some foreign substance may get in between the surfaces and crowd the spindle over. In either of these happenings we would have a one-sided stream until the orifice was closed. To prevent this, I construct the spindle with its discharge end hinged to the main stem with a hook and eye, as shown in Fig. 9. With this arrangement the force of the water will always keep the ball or head of the spindle in the center of the opening and the spray will be uniform. It has been the custom in using paris-green and other poisons to mix the same with land-plaster. This is a wasteful way and is also deleterious to the health of the person who uses it and cannot be distributed evenly, especially in windy weather. Devices which have heretofore used liquid solutions of poison have pumped the liquid direct from the tank. This construction necessitates the use of a copper pump and is inaccessible in case of repairs, and when occasion for repairs occurs must be removed from the tank, which is expensive. Besides, the tank must have a venthole of some kind, which is apt to leak or spill the fluid upon the person who carries the machine. With my construction of airtight tank and outside air-pump all these faults are avoided. The connection between the flexible discharge-pipe C and pipe D is made in the usual way—namely, a ring-coupling on the end of the flexible pipe C and the outer end of the pipe D screws into the opening $d^{19}$ in the elbow D'. The outlet $d^{20}$ in said elbow is internally threaded and the inlet $d^{21}$ to the nozzle is externally threaded and screws into the opening $d^{20}$. The nut $d^{17}$ screws onto the inlet. This nut is beveled on its upper face. The edge of the outlet to connection D is also beveled to correspond. A packing $d^{18}$ is interposed, so that when this nut, which acts as a check-nut, is screwed up it will form a tight joint and allow the nozzle to be fixed in any position in a plane parallel to the longitudinal center line of D. By this arrangement the spray can be thrown upon the under side of the leaves of the plant or made to strike the plant in any desired direction.

The operation of the machine is as follows: The operator fills the tank with the required amount of water with the proper proportion of poison, and by means of the straps passing through the loops E holds it upon his back, holding the nozzle-pipe in one hand, and with his other hand hold of the handle $g^2$ works, through the lever G, the air-pump B, as the agitator or paddle support extends through the top of the can and forms the fulcrum for lever G, and the connection between the piston-rod and the lever is made direct—that is, without the intervention of any link. The working of this lever at the same time the piston is moved rocks the fulcrum and moves the agitator two strokes to every one of the pump. It is of the utmost importance that the liquid should be thoroughly and uniformly mixed. If the liquid is too strong it will kill the plants, so that when the tank has been filled with the proper proportion of water and poison the poison will settle, making the portion first expelled too strong and the portion last expelled too weak. Hence the necessity of perfect agitation. In practice I find this form or paddle-agitator is the best. It is located just above the outlet and acts close to the bottom of the tank. Its motion forces the liquid into a current which passes up the inner circumference of the tank and down in the center. When the operation is begun, the agitator will make a few strokes before the air-pump has compressed the air in the tank sufficiently to commence the discharge, so that the liquid will be properly mixed before any discharge is made, otherwise there would be danger of destruction of some of the plants on the start, especially with a careless operator. The operator can direct the fluid by means of the flexible discharge-pipe.

Having thus fully described my invention, what I claim as new, and desire to secure by Letters Patent, is—

1. In a spraying apparatus, the combination of the tank, the air-pump, the laterally-vibrating agitator and mechanism for operating the same substantially as described.

2. In a spraying apparatus, the combination of the tank, the air-pump, the agitator and the lever for working the pump and agitator, the agitator-support forming the fulcrum upon which the lever works substantially as described.

3. In a spraying apparatus, the combination of the tank, the air-pump alongside of the tank, the looped piston-rod, the pump-operating lever hinged to the outer branch of said looped rod, and the laterally-vibrating fulcrum for said lever, hinged to the tank, substantially as described.

4. In a spraying apparatus, the combination of the tank and the flexible central part of its top, the air-pump alongside of said tank, the pump-operating lever hinged to the looped piston-rod of said pump, with the fulcrum for the lever hinged to the tank by means of lateral arms, and a central arm connected to the flexible part of the cover of the tank, and an agitator pendent from the central arm substantially as described.

5. In a spraying apparatus, the combination of the tank and the flexible central part of its top, the air-pump alongside of the tank, the pump-operating lever hinged to the piston-rod of the pump, with the fulcrum for the lever hinged to the tank by means of side arms, and a central arm rigidly connected to the fulcrum, and said central arm connected to the flexible part of the top of the cover, said flexible part constituting a packing or gasket to render the opening air-tight, substantially as described.

6. In a spraying apparatus, the combination of a vertical tank and its flexible top, a vibrating paddle having its spindle connection passing through said flexible top, said paddle being located within the tank, with its lower edge just over the discharge-pipe, with mechanism for actuating the paddle substantially as and for the purpose described.

7. In a spraying apparatus, the combination and arrangement of the air-tight tank, an air-pump located on the outside of said tank, a lever one arm of which is connected with the piston of the pump, the other arm is connected with the power to work the lever, and a fulcrum, hinged to the tank, and to which fulcrum is attached and actuated a vibrating paddle or agitator, substantially as described.

8. In a spraying apparatus, the combination of a flexible discharge-pipe, and the nozzle having inlet 21 about half-way of its length, the connecting-pipe D and the elbow D', the latter being threaded internally at both ends, the opening at one end being conical, the inlet 21 having thereon a check-nut having a conical top substantially as described.

9. In a spraying apparatus, a nozzle connected to the discharge-pipe, consisting of a hollow cylinder, in which works a spindle on which is rigidly fixed a collar, in which is cut a spiral groove on its perimeter, said collar located near the outer or discharge end of the spindle and which fits into and moves snugly in said cylinder in the form of a piston, said spindle furnished with a spring at the end opposite the discharge end; the cylinder furnished with an inclosing cap at one end perforated to allow the discharge of the liquid; an inclosing cap perforated to receive the spindle, a solid portion also perforated to receive the spindle and to form a bearing therefor at the other end; substantially as described.

10. In a spraying apparatus, the combination of a flexible discharge-pipe and its nozzle having inlet 21 about half-way of its length, the connecting-pipe D, and the elbow D' having a screw-threaded and conical opening at one end, with a check-nut, having a conical top and mounted upon the inlet 21, the nozzle having also a screw-cap at each end, packing in each screw-cap, a headed rod within the nozzle and a spring between one of the screw-caps and the head of said rod, substantially as described.

11. In a spraying apparatus, a nozzle connected to the discharge-pipe, consisting of a hollow cylinder in which works a spindle on which is rigidly attached a collar, in which is cut a spiral groove on its perimeter, said collar located at a point on the spindle near the outer or discharge end of the cylinder, and which fits into and moves snugly in said cylinder in the form of a piston, said spindle being furnished with a spring, at the end opposite the discharge end of the cylinder; furnished with an inclosing cap at one end perforated to allow the discharge of the liquid; an inclosing cap perforated to receive the spindle, the cylinder being solid for a short distance also perforated to form a bearing for the spindle at the other end; and the spindle formed to make a sharp point to enter the discharge-hole in the cap; substantially as and for the purpose described.

JOHN H. BURCK.

Witnesses:
ADDISON GETTY,
IRA J. WOOD.